(12) United States Patent
Prasad

(10) Patent No.: US 6,700,335 B2
(45) Date of Patent: Mar. 2, 2004

(54) METHOD AND CIRCUIT FOR REGULATING POWER IN A HIGH PRESSURE DISCHARGE LAMP

(75) Inventor: Himamshu V. Prasad, Rolling Meadows, IL (US)

(73) Assignee: Osram Sylavania, Inc., Danvers, MA (US)

( * ) Notice: Subject to any disclaimer, the term of this patent is extended or adjusted under 35 U.S.C. 154(b) by 0 days.

(21) Appl. No.: 09/967,104

(22) Filed: Sep. 28, 2001

(65) Prior Publication Data

US 2003/0062848 A1 Apr. 3, 2003

(51) Int. Cl.[7] ............................................. H05B 37/02
(52) U.S. Cl. ........................ 315/307; 315/224; 315/247
(58) Field of Search ................................. 315/307, 224, 315/247

(56) References Cited

U.S. PATENT DOCUMENTS 5,481,163 A * 1/1996 Nakamura et al. .......... 315/308
6,215,252 B1 * 4/2001 Stanton ....................... 315/224

* cited by examiner

*Primary Examiner*—David Vu
(74) *Attorney, Agent, or Firm*—Kenneth D. Labudda

(57) ABSTRACT

A ballast (100) and method for regulating power in a high pressure discharge lamp (130) is disclosed. In a preferred embodiment, ballast (100) comprises a microcontroller (102), a buck converter (110), and an inverter (120). Microcontroller (102) monitors a signal representative of the lamp voltage and sets a current in the lamp based upon the monitored signal via control of a buck current provided by the buck converter (110). A method for regulating power in a high pressure discharge lamp is also described. The method comprises steps of detecting (202) a voltage at the lamp and setting (204) a current in the lamp based upon the detected voltage.

15 Claims, 4 Drawing Sheets

METHOD AND CIRCUIT FOR REGULATING POWER IN A HIGH PRESSURE DISCHARGE LAMP

FIELD OF THE INVENTION

The present invention generally relates to an electronic ballast, and more particularly to a circuit for regulating power in an electronic ballast.

BACKGROUND OF THE INVENTION

Typically, an electronic ballast must regulate lamp power when operating a high-intensity discharge lamp. This is accomplished by sensing the lamp current and the lamp voltage either directly or indirectly and multiplying the two signals to get the wattage. The multiplication is usually done using microcontroller or a microprocessor. The wattage is then compared to the reference wattage. A feedback loop is provided in such a way that the error that results from this comparison is converted to a signal such that the lamp current is adjusted so that the measured lamp power is equal to the reference power.

However, such sensing circuitry can be expensive. In manufacturing electronics generally, any reduction in the necessary parts can be significant. In the field of electronic ballasts, any improvement which can reduce the cost of electronic control circuits is significant. For example, the reduction or elimination of detection circuitry can reduce part count and reduce cost significantly. Such cost reductions are particularly significant when a particular unit, such as an electronic ballast, is manufactured and sold in major quantities.

Accordingly, it is desirable to provide an improved electronic ballast in which the amount of sensing circuitry is reduced.

SUMMARY OF THE INVENTION

This disclosure describes a way in which an electronic ballast can operate a high intensity discharge (HID lamp) at a constant power without the need to sense the lamp current either directly or indirectly. Currently, all ballast manufacturers in the market provide power regulation by sensing both the voltage and current of the lamp either directly or indirectly. If there is no need to sense the lamp current then the circuitry associated with this sensing can be eliminated, resulting in a significant cost savings for the ballast.

The present invention relates to a circuit for regulating power in a high pressure discharge lamp that sets a current in the lamp based upon a detected voltage. According to another aspect of the invention, a method for regulating power in an electronic ballast of a high pressure discharge lamp comprises steps of detecting a voltage in the electronic ballast of the high pressure discharge lamp and setting a current in the electronic ballast based upon the detected voltage.

It is an object of the present invention to regulate power in an electronic ballast by controlling the current to a high intensity discharge lamp.

It is a further object of the present invention to eliminate the need for current sensing circuitry for lamp power regulation in an electronic ballast.

It is a further object of the present invention to set an appropriate current based upon the detected voltage in the high intensity discharge lamp.

It is a further object of the present invention to regulate the power in a high intensity discharge lamp by varying the current provided to a high intensity discharge lamp based upon the detected voltage.

Other objects and advantages will become apparent from the following specification taken in connection with the accompanying drawings.

DESCRIPTION OF THE PREFERRED EMBODIMENTS

Figure 1:
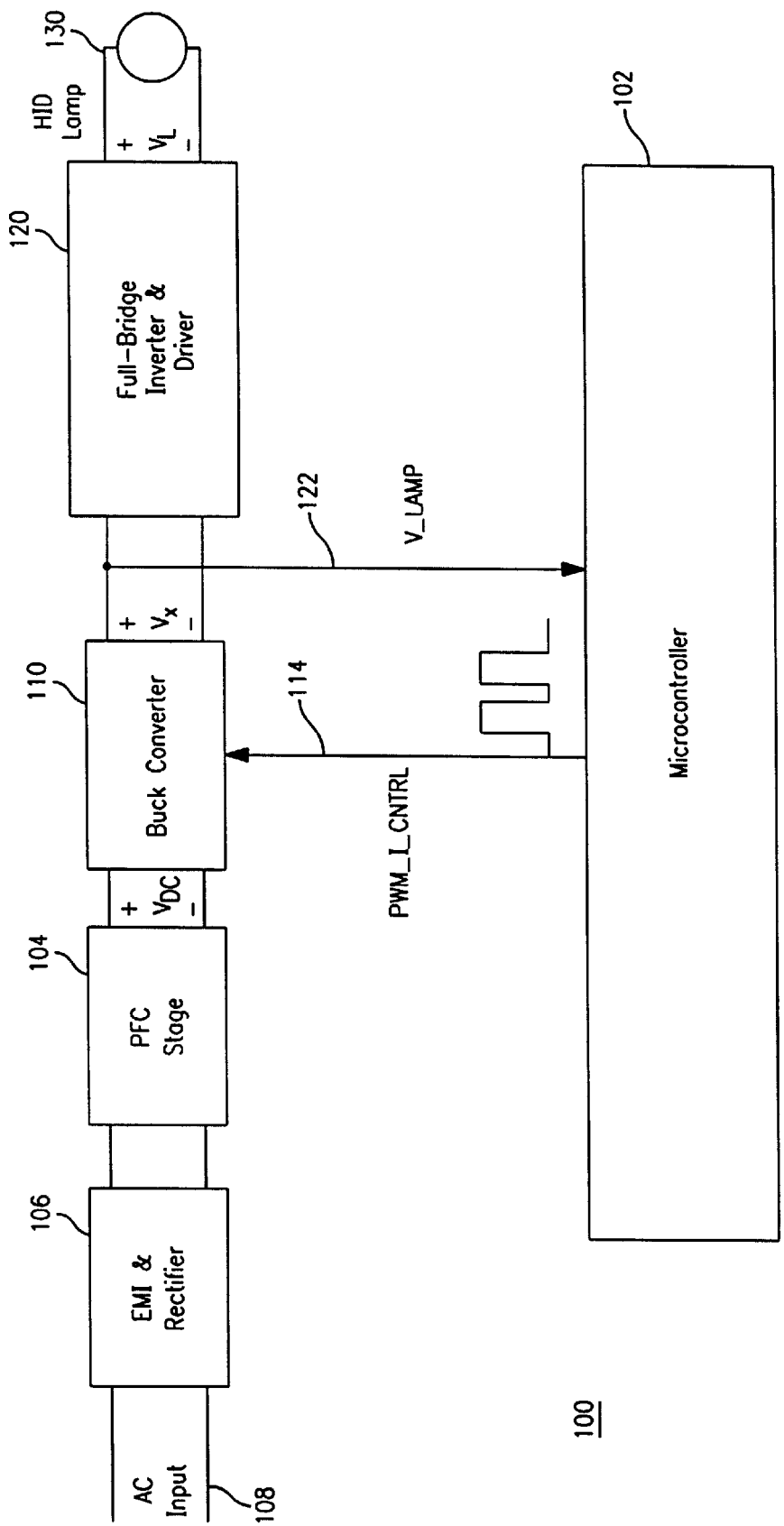
FIG. 1 is a block diagram of a ballast for powering a high pressure discharge lamp, in accordance with the present invention.

Referring to FIG. 1, a ballast 100 for powering a high pressure discharge lamp 130 includes a microcontroller 102, a power factor correction (PFC) stage 104, a rectifier stage 106, a buck converter 110, and a full-bridge inverter 120. Rectifier stage 106 receives an alternating current (AC) input 108 (e.g., conventional 60 hertz AC voltage) and generates a full-wave rectified AC voltage. A power factor correction (PFC) stage 104 receives the rectified voltage from rectifier stage 106 and generates a DC voltage, $V_{DC}$. Buck converter 110 receives $V_{DC}$ and generates another DC voltage, $V_X$. Inverter 120 receives $V_X$ and generates an alternating voltage, $V_L$, that is provided to lamp 130.

Buck converter 110 generally controls the current provided to lamp 130 by way of inverter 120. Buck converter 110 is controlled by a pulse width modulated (PWM) signal 114 from the microcontroller 102. Microcontroller 102 is also coupled to inverter 120 to detect a voltage sense signal (V_LAMP) 122 that is representative of the lamp voltage, $V_L$.

Figure 2:
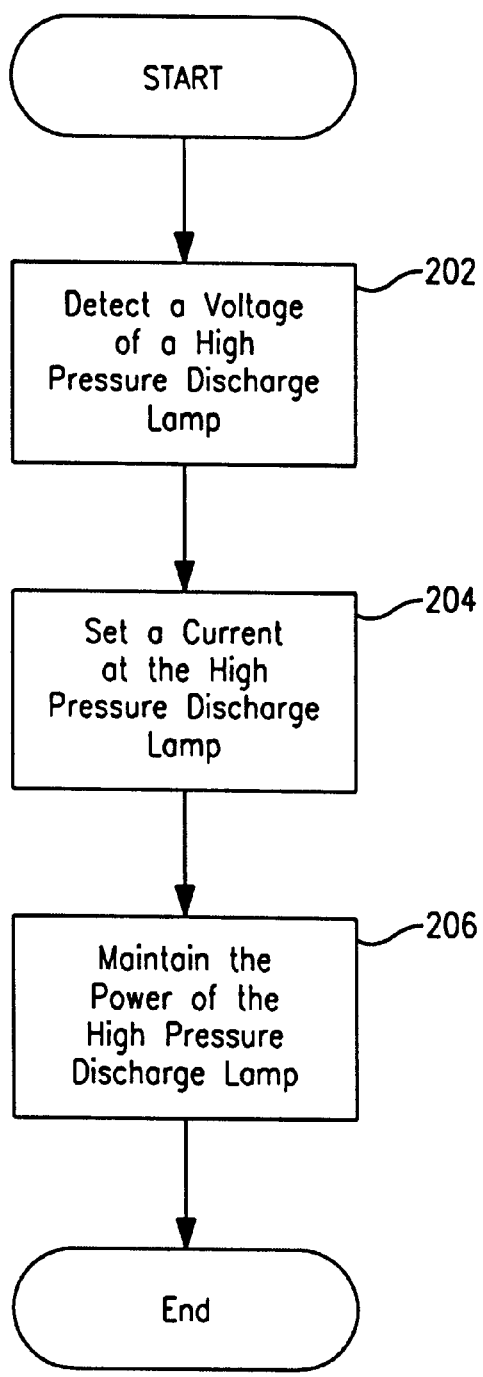
FIG. 2 is a flow chart showing a method for regulating power in a high pressure discharge lamp, in accordance with the present invention.

A method for controlling current in a high pressure discharge lamp is shown in FIG. 2. A circuit, such as the circuit shown in FIG. 1, detects a voltage of a high pressure discharge lamp at a step 202. The voltage could be measured directly at the lamp, or indirectly at some other point of the circuit where the voltage can be determined. The circuit then sets a current at the high pressure discharge lamp at a step 204. Preferably, the buck current in the circuit is controlled to set a current in the lamp. Finally, the circuit maintains the power at the high pressure discharge lamp at a step 206.

Figure 3:
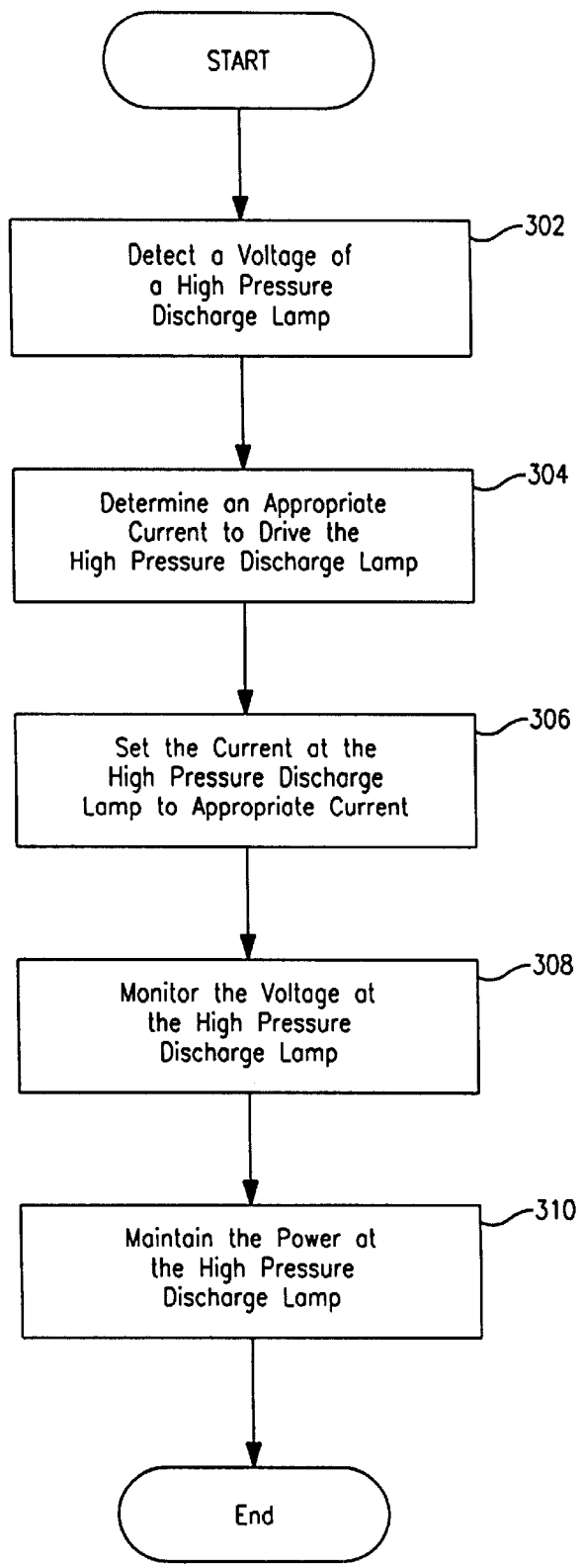
FIG. 3 is a flow chart describing an alternative embodiment of a method for regulating power in a high pressure discharge lamp, in accordance with the present invention.

A method for controlling current in a high pressure discharge lamp according to an alternative embodiment is described in FIG. 3. A circuit, such as the circuit of FIG. 1, detects a voltage of a high pressure discharge lamp at a step 302. Preferably, the voltage is detected either at a full bridge inverter coupled to the lamp, or at the lamp itself. However, the voltage could be detected at any location in the circuit which would provide an indication of voltage at the lamp. The control circuit then determines an appropriate current to drive the high pressure discharge lamp at a step 304. The appropriate current could be determined in a variety of ways. Preferably, the appropriate current can be calculated in advance by an engineer who determines the appropriate current based on detected voltages. Such calculated values of appropriate currents for detected voltages can then be incorporated in a look-up table which can be accessed by microcontroller 102.

As described in Table 1, for example, an exemplary look-up table includes appropriate current values to apply to the lamp. Such appropriate current values can be calculated in advance, and then loaded into microcontroller 102. A lamp voltage is measured and preferably scaled to a value between zero and 5 volts, for example. Such scaling is preferably performed by an external circuit before the value is provided to the microcontroller. The scaled value is then preferably converted to a hexadecimal value from, for example, 0–255 for an 8-bit microcontroller. The lamp power shown in Table 1 represents a fixed reference which corresponds to a preferred output power, which is based upon the design of the ballast. The lamp current shown in the table is the current necessary to generate the preferred output power based upon the measured voltage. The lamp current, which represents a calculated value based upon the detected voltage and a preferred output power, is provided to the lamp. The lamp current shown in Table 1 is also preferably stored within microcontroller 102 as a hexadecimal value.

TABLE 1

| Lamp Voltage | Scaled Voltage | Lamp Hex | Lamp Power | Lamp Current | Lamp Current Hex |
|---|---|---|---|---|---|
| 50 | 2.5 | 128 | 10 | 4 | 204 |
| 52 | 2.6 | 133 | 10 | 3.84615385 | 196 |
| 54 | 2.7 | 138 | 10 | 3.7037037 | 189 |
| 56 | 2.8 | 143 | 10 | 3.57142857 | 182 |
| 58 | 2.9 | 148 | 10 | 3.44827586 | 176 |
| 60 | 3 | 153 | 10 | 3.33333333 | 170 |
| 62 | 3.1 | 158 | 10 | 3.22580645 | 165 |
| 64 | 3.2 | 163 | 10 | 3.125 | 159 |
| 66 | 3.3 | 168 | 10 | 3.03030303 | 155 |
| 68 | 3.4 | 173 | 10 | 2.94117647 | 150 |
| 70 | 3.5 | 179 | 10 | 2.85714286 | 146 |
| 72 | 3.6 | 184 | 10 | 2.77777778 | 142 |
| 74 | 3.7 | 189 | 10 | 2.7027027 | 138 |
| 76 | 3.8 | 194 | 10 | 2.63157895 | 134 |
| 78 | 3.9 | 199 | 10 | 2.56410256 | 131 |
| 80 | 4 | 204 | 10 | 2.5 | 128 |
| 82 | 4.1 | 209 | 10 | 2.43902439 | 124 |
| 84 | 4.2 | 214 | 10 | 2.38095238 | 121 |
| 86 | 4.3 | 219 | 10 | 2.3255814 | 119 |
| 88 | 4.4 | 224 | 10 | 2.27272727 | 116 |
| 90 | 4.5 | 230 | 10 | 2.22222222 | 113 |
| 92 | 4.6 | 235 | 10 | 2.17391304 | 111 |
| 94 | 4.7 | 240 | 10 | 2.12765957 | 109 |
| 96 | 4.8 | 245 | 10 | 2.08333333 | 106 |
| 98 | 4.9 | 250 | 10 | 2.04081633 | 104 |
| 100 | 5 | 255 | 10 | 2 | 102 |

Alternatively, a microcontroller could run a program in real time to automatically calculate the appropriate current.

After determining an appropriate current value, the circuit then sets the current at the high pressure discharge lamp to the appropriate current at a step 306. The circuit also monitors the voltage at the high pressure discharge lamp at a step 308. The circuit preferably maintains the power at the high pressure discharge lamp in a step 310.

Figure 4:
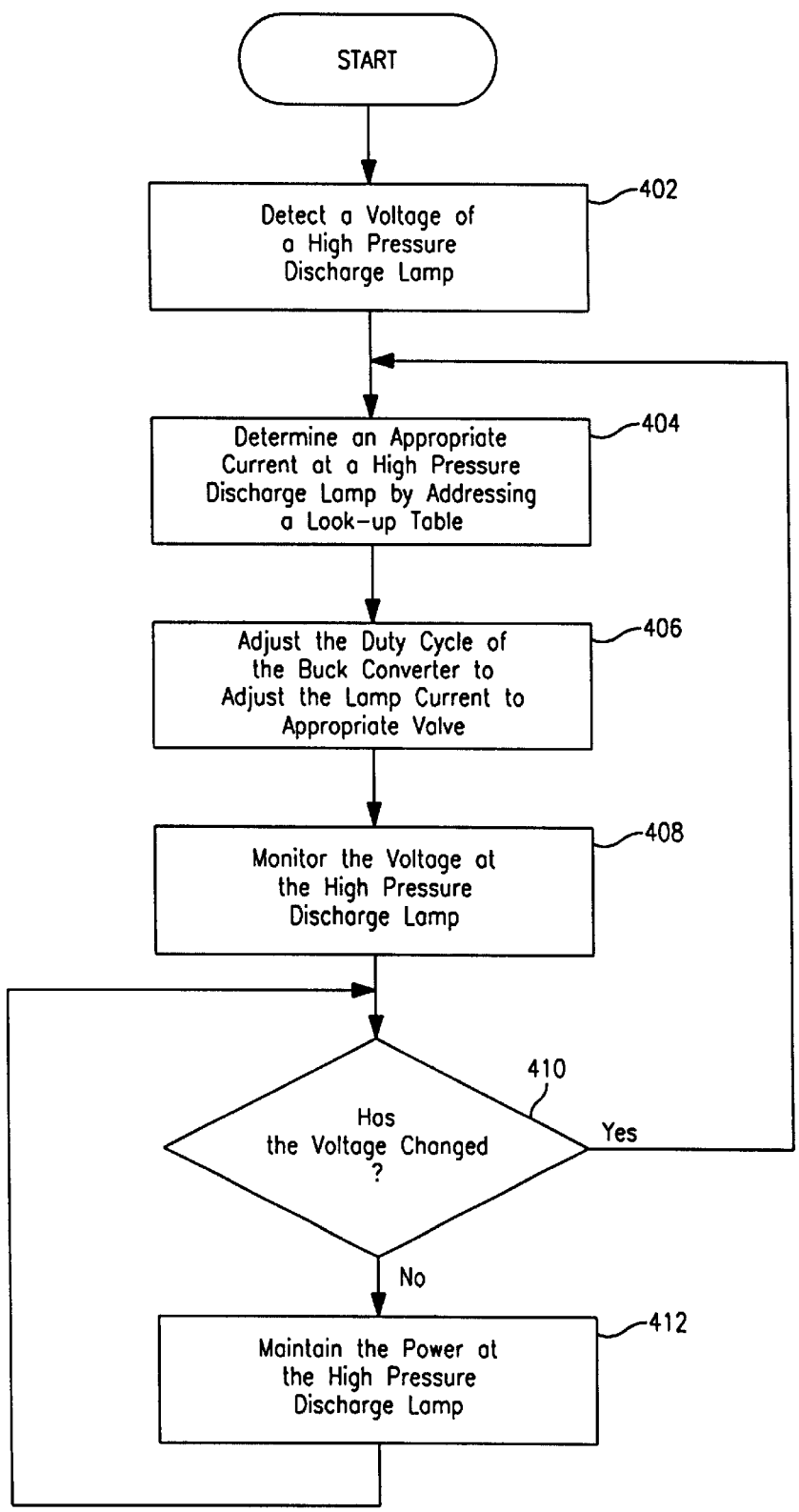
FIG. 4 is a flowchart describing a further alternative embodiment of a method for regulating power in a high pressure discharge lamp, in accordance with the present invention.

A further alternative embodiment of a method for regulating the power of a high pressure discharge lamp is described in FIG. 4. A circuit, such as microcontroller 102, detects a voltage of a high pressure discharge lamp at a step 402. The circuit then determines an appropriate current at the high pressure discharge lamp by addressing a look-up table at a step 404. The circuit adjusts the pulse width modulated signal (PWM_I_CNTRL in FIG. 1), and hence the duty cycle of buck converter 110 and the level of the buck current, to adjust the current in the lamp to the appropriate value at a step 406. Alternatively, the circuit could provide frequency control to adjust the buck current. The circuit also monitors the voltage at the high pressure discharge lamp at a step 408, and then determines if the voltage has changed at a step 410. If the voltage has not changed, the circuit maintains the current at the high pressure discharge lamp in a step 412. However, if the voltage has changed, the circuit determines the appropriate current at a step 404.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. For example, the method of the present disclosure is applicable to any system requiring delivery of a controlled amount of power to a load. Further, the present method can be implemented in ballasts in which the buck converter and full-bridge inverter are integrated (i.e., where two of the inverter transistors also serve as a buck switch and a buck rectifier). Moreover, although the present disclosure has focused on applications to a HID lamp, it should be appreciated that the method and circuit of the present invention are also applicable to other types of lamps. It is contemplated that the appended claims will cover any such modifications or embodiments that fall within the true scope of the invention.

I claim:

1. A method for regulating power in a high pressure discharge lamp, the method comprising the steps of:
   detecting a voltage associated with the high pressure discharge lamp, the lamp having an actual current flowing through it;
   determining a desired current based solely upon the voltage associated with the high pressure discharge lamp, such that the power in the high pressure discharge lamp is equal to a reference power, wherein the desired current is determined independent of any current associated with the actual current flowing through the lamp; and
   setting a current in the high pressure discharge lamp based upon the desired current.

2. The method of claim 1 wherein the step of detecting a voltage comprises detecting the voltage at the high pressure discharge lamp.

3. The method of claim 1 wherein the step of determining a desired current comprises calculating a desired current.

4. The method of claim 1 wherein the step of determining a desired current comprises selecting a desired current from a look-up table.

5. The method of claim 1 further including a step of maintaining the power at the high pressure discharge lamp.

6. The method of claim 5 wherein the step of maintaining the power comprises adjusting the current to maintain the power at the high pressure discharge lamp.

7. The method of claim 6 wherein the step of adjusting the current to maintain the power at the high pressure discharge lamp comprises periodically checking the voltage and adjusting the current such that the power at the high pressure discharge lamp is equal to a reference power.

8. The method of claim 6 wherein the step of adjusting the current to maintain the power at the high pressure discharge lamp comprises adjusting the duty cycle of a buck converter.

9. A method for regulating power in a high pressure discharge lamp, the method comprising the steps of:

monitoring a voltage associated with the high pressure discharge lamp, the lamp having an actual current flowing trough it;

determining a desired current based solely upon the voltage associated with the high pressure discharge lamp, such that the power at the high pressure discharge lamp is equal to a reference power, wherein the desired current is determined independent of any current associated with the actual current flowing through the lamp;

setting a current driving the high pressure discharge lamp to the desired current; and maintaining the power in the high pressure discharge lamp equal to the reference power by periodically checking the voltage and adjusting the desired current such that the power in the high pressure discharge lamp remains equal to the reference power.

10. The method of claim 9 wherein the step of monitoring a voltage comprises monitoring the voltage at the high pressure discharge lamp.

11. The method of claim 9 wherein the step of determining a desired current comprises calculating a desired current.

12. The method of claim 9 wherein the step of determining a desired current comprises selecting a desired current from a look-up table to create a predetermined output power.

13. The method of claim 9 wherein the step of maintaining the power in the high pressure discharge lamp comprises varying the duty cycle of a buck converter.

14. A circuit for regulating power in a high pressure discharge lamp, comprising:

a buck converter;

an inverter coupled to the buck converter and the lamp; and a circuit coupled to the inverter and the buck converter, and operable to:

detect a voltage associated with the lamp, and set a duty cycle of the buck converter based solely upon the detected voltage associated with the lamp and a desired power for the lamp, thereby setting a current for driving the lamp, wherein the duty cycle it determined independent of any current associated with the actual current flowing through the lamp.

15. The circuit of claim 14 wherein the duty cycle is selected from a look-up table.

* * * * *